United States Patent [19]
Mori et al.

[11] Patent Number: 5,659,360
[45] Date of Patent: Aug. 19, 1997

[54] IMAGE DATA CIRCUIT FOR CORRECTING SENSITIVITY DIFFERENCES BETWEEN IMAGE SENSORS

[75] Inventors: Kenichi Mori; Shotaro Yokoyama, both of Nagano, Japan

[73] Assignee: Fuji Electric Co., Ltd., Japan

[21] Appl. No.: 385,957

[22] Filed: Feb. 9, 1995

[30] Foreign Application Priority Data

Feb. 9, 1994 [JP] Japan .................................... 6-014744

[51] Int. Cl.⁶ .................................................. H04N 5/335
[52] U.S. Cl. ................................................ 348/297; 348/241
[58] Field of Search .............................. 348/241, 250, 348/47, 294, 311, 297, 298

[56] References Cited

U.S. PATENT DOCUMENTS

| | | | |
|---|---|---|---|
| 4,317,134 | 2/1982 | Woo et al. | 348/241 |
| 4,335,317 | 6/1982 | Grassl | 250/578 |
| 4,959,726 | 9/1990 | Miida et al. | 348/350 |
| 5,047,861 | 9/1991 | Houchin et al. | 348/241 |
| 5,086,343 | 2/1992 | Cook et al. | 248/241 |
| 5,331,420 | 7/1994 | Yamano et al. | 348/241 |

*Primary Examiner*—Andrew Faile
*Assistant Examiner*—Andrew B. Christensen
*Attorney, Agent, or Firm*—Rossi & Associates

[57] ABSTRACT

An image data circuit compensates sensitivity differences in image detection between a pair of image sensors. The image sensors each include a plurality of charge storage type optical sensing elements. Correction data indicative of sensitivity difference between the image sensors is stored in permanent memory. A clock pulse generator circuit generates clock pulses for counting charge storage periods indicated by output signals from the optical sensing elements. A pair of counter circuits counts the clock pulses and outputs count values corrected with the correction data and corresponding to the charge storage periods. A pair of quantizing circuits converts the output signals to image data based on the corrected count values.

10 Claims, 3 Drawing Sheets

IMAGE DATA CIRCUIT FOR CORRECTING SENSITIVITY DIFFERENCES BETWEEN IMAGE SENSORS

FIELD OF THE INVENTION

The present invention relates to a circuit for picking out or transferring image data, which exactly represent an image of an object to be detected, from a pair of image sensors incorporated with an optical means suitable for subject detection in an auto-focussing camera.

BACKGROUND

Semiconductor image sensors have been widely utilized, as the fine structures required by the images sensor are easily processed by conventional semiconductor processing techniques and the semiconductor image sensors are easily incorporated in various devices by virtue of high density integration with their pertinent circuits in a semiconductor chip. Since it is necessary to incorporate the image sensor or sensors with optical means such as lenses etc. for image detection, the image sensor or sensors are very often incorporated with the optical means into a module. In application to auto-focussing cameras, it is necessary to incorporate, as is well known, a pair of image sensors in a camera for detecting a distance between the camera and a subject or for detecting focussing level. FIG. 3 is a sectional view showing a main portion of a module into which the optical means and a pair of image sensors are incorporated.

A semiconductor apparatus 70 shown in the lower portion of FIG. 3 is comprised of a chip 71 into which a pair of right and left image sensors 10R and 10L and their pertinent circuits are incorporated; a die plate 72 of a lead frame on which the chip 71 is mounted as usual; and a package 75, for example of transparent resin, in which the die plate 72, the chip 71 and bonding wires 74 connecting the chip 71 and leads 73 are sealed. The image sensor 10R or 10L is further comprised of a plurality, e.g. 128 pieces, of optical sensing elements. So-called charge storage type optical sensing elements are used for the sensor 10R or 10L for detecting an image of a subject as precisely as possible, for example in the auto-focussing camera.

An optical means 80 is comprised of a small transparent plastic mold in which a pair of lenses 80R and 80L which focus the images of the subject on the image sensors 10R and 10L. The optical means 80 is bonded, e.g. by adhesion, with the semiconductor apparatus 70 into a module through an opaque plastic mold adaptor 81. The images of the subject through the lenses 80R, 80L and internal spaces 81a of the adaptor 81 are formed on the image sensors 10R, 10L separated from the lenses 80R, 80L by their focussing length.

Though the image detection precision has been improved by the use of the charge storage type optical sensing elements for the image sensors, a much higher precision has been required recently in image detection such that it is now very hard to attain the required precision by the module in which the image sensors and the optical means are incorporated. Though the optical sensing element for auto-focussing camera is now required to convert the received light intensity with the precision of 8 bits, i.e. with an error of less than 1%, to the image data, the conversion precision according to the prior art remains at 5 or 6 bits, i.e. an error of from 2 to 3%.

Though this limitation is caused by the deviation of optical sensitivity between many optical sensing elements, the limitation is mainly caused by the deviations in relative position and attitude of the image sensors and the optical means from the ideal or designed position and attitude which is further caused by the process through which the image sensors and the optical means are incorporated. FIG. 4 is a diagram for explaining the distributions of the image data DR and DL obtained by the optical sensing elements in the image sensors 10R and 10L when the optical means 80 is irradiated with a uniformly distributing light. In FIG. 4, the distribution of the image data DL with the i-th optical sensing element in the image sensor 10L is shown on the left hand side of the figure with i varying from 1 to m, and the distribution of the image data DR with m pieces of the optical sensing elements in the image sensor 10R is shown on the right hand side of the figure. The distributions of the image data are expanded in FIG. 4 for clarity except small variations in the image data DR or DL of the individual optical sensing element.

As shown in FIG. 4, though the image data DR and DL show upward concave quadratic distributions, the difference Dc between the average levels of the image data DR, DL from the image sensors 10R, 10L is more conspicuous than the quadratic distributions of the image data. The difference Dc between the average levels of the image data DR, DL is obviously caused not by the detection sensitivity variation between the optical sensing elements, but by the difference between the quantity of light received by the image sensors 10R and 10L through the optical means 80.

In view of the foregoing, an object of the present invention is to provide an image data circuit for a pair of image sensors which compensates the above described difference between the distribution levels of the image data obtained with the image sensors which receive images of a subject from the optical means.

SUMMARY OF THE INVENTION

The object of the present invention is achieved by an image data circuit, for picking out image data from a pair of image sensors, each of which has charge storage type optical sensing elements and receives an image of a subject from an optical means, which is comprised of a permanent storage means for storing correction data, obtained by a test operation conducted on the image sensors combined with the optical means, indicative of sensitivity difference between the image sensors; a clock pulse generator circuit which generates clock pulses for counting charge storage periods indicated by output signals output from the optical sensing elements; a counter circuit for counting the clock pulses and for outputting count values, corrected at every image detection with the correction data; and a quantizing circuit for receiving the output signals from the optical sensing elements and count values from the counter circuit and for converting the output signals to the image data corresponding to the received count values. The permanent storage means is preferable comprised of a PROM.

The counter circuit is preferably further comprised of a pair of programmable counters, each of which corresponds to each of the image sensors, and the count values of which are initialized with the correction data at the start of the image detection. Alternatively, it is preferable to initialize the count value of one of the programmable counters with the correction data at the start of the image detection. It is also preferable to dispose a counter circuit in common with the image sensor pair and correct the count values output to one of the image sensors with the correction data in an operational circuit.

The quantizing circuit can be constructed from of a plurality of latches. The output signal from each optical sensing element is preferably fed to the corresponding latch as a latching command, and the count value of the counter circuit when the logic state of the output signal changes, that is the count value corresponding to a charge storage period indicated by the output signal from corresponding one of the optical sensing elements, is preferably stored as an image data. The image data are read out one by one from the quantizing circuit by feeding output commands one by one to the corresponding latches.

The correction data can be set, most simply, based on the test operation conducted under uniform light irradiation on the optical means. It is most reasonable to set the correction data based on a difference between averages of image data from the image sensors. A difference between the minimum values in the image data groups may be easily but satisfactorily used as the correction data.

It is preferable to use the optical sensing elements, the detection sensitivities of which are changeable, and to set the correction data at every detection sensitivity level. It is practical to dispose a detecting means which detects the shortest charge storage period in common with the image sensors or for each image sensor and to start clock pulse generation at the timing corresponding to the detected shortest charge storage period.

Since the level difference between the image data from a pair of image sensors is caused by the difference of light quantities received by the image sensors and is unique to the sensor pair combined with an optical means, the present invention corrects the image data at every image detection operation with the correction data obtained by a test operation. Since the image data are obtained from the charge storage type optical sensing element by counting the charge storage period with the clock pulse, the levels of image data are corrected easily by correcting the counts of the clock pulse with the correction data.

The permanent storage means stores the difference correction data for correcting the sensitivity difference in image detection between the image sensors measured by the test operation. At every image detection operation, the clock pulse count values of the counter circuit are corrected with the correction data. In addition, the quantizing circuit converts the corrected clock pulse count values corresponding to the charge storage period indicated by the pulse width of the output signals from the optical sensing elements to the image data.

Since an additional means such as a microcomputer etc. is not necessary to correct the image data, and since the sensitivity level difference between the image sensors is corrected automatically simultaneously with the image data generation with the permanent storage means and its pertinent circuits incorporated into the semiconductor apparatus, it takes no additional time to correct the image data and the image data circuit applied to the auto-focussing camera reduces the load of the annexed apparatuses such as a microcomputer for controlling.

BRIEF DESCRIPTION OF THE DRAWINGS

The invention will be described in greater detail with reference to the accompanying drawings, wherein:

FIGS. 2(a)–(d) show diagrams explaining an embodiment and function of the charge storage type optical sensing element in the image sensor, in which FIG. 2(a) is a circuit diagram for the optical sensing element, FIG. 2(b) is a wave chart of the reset pulse which triggers the operation of the sensing element circuit, FIG. 2(c) is a wave chart illustrating electric potential change with charge storage, and FIG. 2(d) a wave chart of the output signal form the optical sensing element;

DETAILED DESCRIPTION OF THE PREFERRED EMBODIMENT

Figure 1:
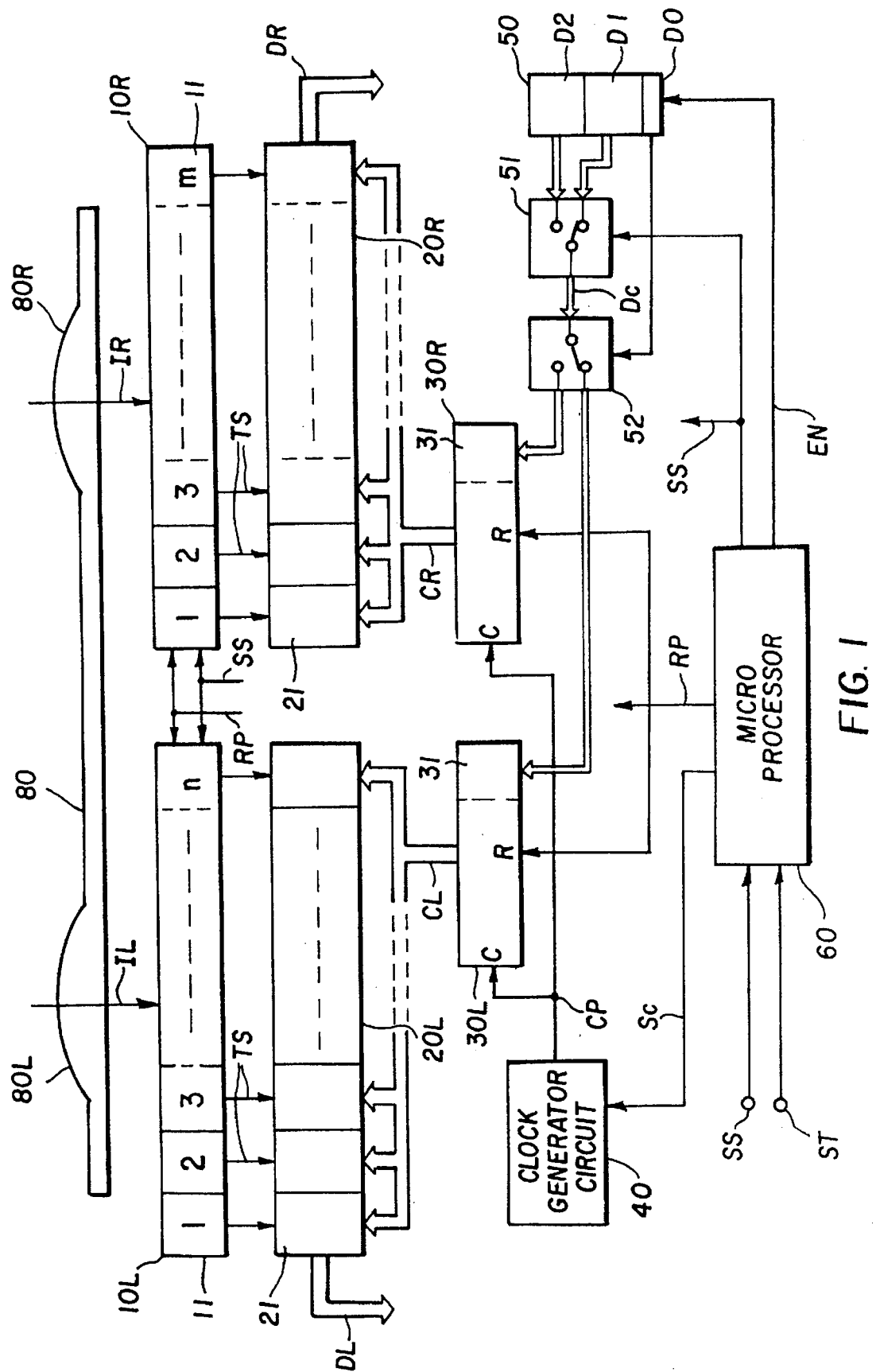
FIG. 1 is a block circuit diagram of an embodiment of the image data circuit according to the present invention.

As schematically shown in the upper part of FIG. 1, each of image sensors 10R, 10L, which receive images IR, IL from a pair of lenses 80R, 80L of an optical means 80, is comprised of m pieces, e.g. 128 pieces, of charge storage type optical sensing elements 11. The optical sensing elements 11 simultaneously start a charge storage operation in response to a common reset pulse RP, and output signals TS which are a kind of time signals each of which is indicative of a charge storage period of time corresponding to the quantity of light received by each of the optical sensing elements 11. In this embodiment, a sensitivity signal SS for optical detection is also commonly supplied to the optical sensing elements 11. Before describing the other parts of the circuit of FIG. 1, the charge storage type optical sensing element 11, the sensitivity of which can be changed will be explained with reference to FIG. 2.

Figure 2A:
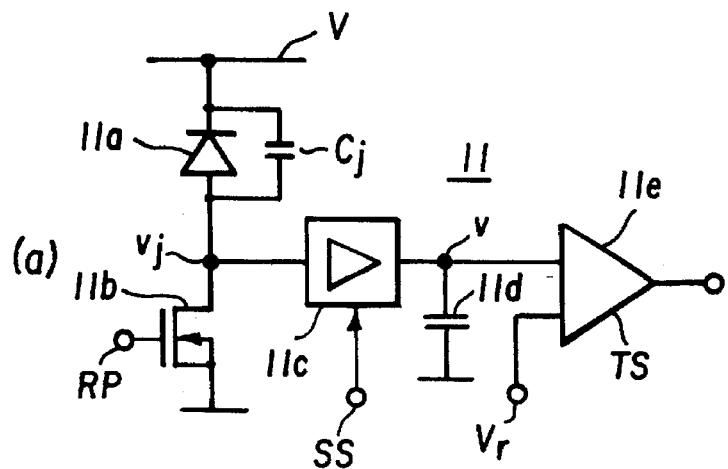

The optical sensing element 11 in this embodiment shown in FIG. 2(a) is comprised of a photodiode 11a, the small junction capacitance Cj of which is utilized as a capacitor for storing electric charges. The junction capacitor Cj is charged up to the supply voltage V when a transistor 11b is switched on by the reset pulse RP. As the capacitor Cj is discharged with a photocurrent of the photodiode 11a, the electric potential vj at the common connection point of the photodiode 11a and the transistor 11b is boosted. The electric potential vj is amplified with the amplification factor corresponding to the above described sensitivity signal SS in an amplifier 11c and charges a capacitor 11d on the output side to an electric potential v. The amplified electric potential v is compared with a reference voltage Vr in a comparator 11e, and the comparison result is output from the optical sensing element 11 as the output signal TS described above.

Figure 2B:
Figure 2C:
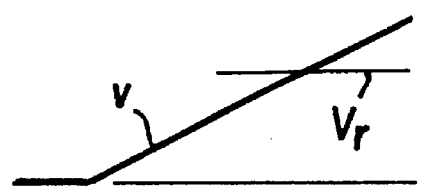
Figure 2D:
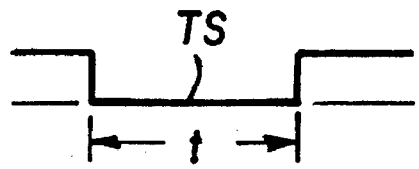

The functions of the optical sensing element 11 of FIG. 2(a) are shown in from FIG. 2(b) to FIG. 2(d). The electric potential v shown in FIG. 2(c) is reset to zero by the reset pulse RP shown in FIG. 2(b), rises with a gradient corresponding to the light intensity received by the photodiode 11e and amplification factor of the amplifier 11c, and is compared with the reference voltage Vr in the comparator 11e. The output signal TS shown in FIG. 2(d) output from the comparator 11e is reset in this embodiment to a logic state "low" by the reset pulse RP and switched to a logic state "high" when the electric potential v reaches the reference voltage Vt. The period of time during which the output signal TS is "low" represents the charge storage period τ of the optical sensing element 11. The output signal TS is converted to image data by counting the charge storage period τ (pulse width) with the clock pulses.

Returning now to FIG. 1, each of quantizing circuits 20R, 20L, shown separately on the right or the left side of the figure includes m pieces of latches 21, each of which receives the output signal TS from the corresponding optical sensing element 11 of the image sensor 10R or 10L, converts the charge storage period τ indicated by the pulse width of the output signal TS to an image data DR or DL of 8 bits, and stores the converted image data. Counter circuits 30R and 30L shown under the quantizing circuits 20R, 20L in FIG. 1 are disposed in this embodiments corresponding respectively to the image sensors 10R and 10L. Each of the counter circuits 30R, 30L feeds a count value CR or C1 for the above described conversion to the quantizing circuit 20R or 20L, and receives clock pulses CP for counting the charge storage period τ from a clock pulse generator circuit 40. Each of the counter circuits 30R, 30L is comprised of a programmable counter, the count value of which is initialized to a correction data in response to the reset pulse RP.

A permanent storage means 50 shown in the lower right part of FIG. 1 stores the correction data Dc. The permanent storage means 50 is preferably comprised of as usual a PROM. Though 3 or 4 bits corresponding to the lower bits 31 of the counter circuit 30R or 301 are usually enough to constitute the correction data Dc corresponding to the image data of 8 bits, two 4 bits memory areas D1, D2 are zoned in the permanent storage means 50 for two detection sensitivity levels of each optical sensing element 11 switched between them, and correction data Dc set at each detection sensitivity level are stored in the memory areas D1, D2. Since the correction applied to either one of the image sensors 10R or 10L is usually suffice, a one bit memory area D0 is zoned in the permanent storage means 50 in this embodiment for storing the data indicating which image data is to be corrected.

In FIG. 1, the first selecting means 51 disposed onto the permanent storage means 50 selects the memory area D1 or D2 of the permanent storage means 50 from which the correction data Dc is to be read out in response to the sensitivity signal 88 described above, and the second selecting means 52 selects the counter circuit 30R or 30L to which the read out correction data Dc is to be fed in response to the one bit data stored in the memory area D0. A sequence control means 60, comprised, for example, of a simple microprocessor, controls the entire circuit of FIG. 1.

Figure 3:
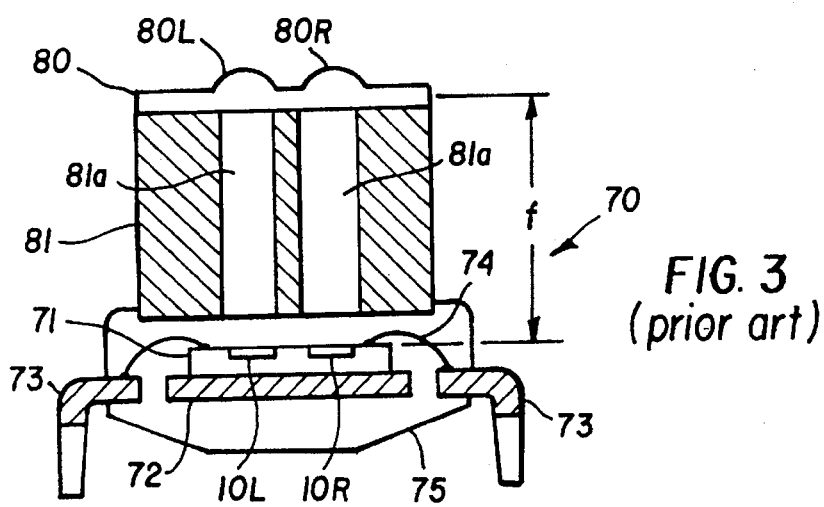
FIG. 3 is a sectional view of a module structure in which the integrated circuit including the image sensors are incorporated with the optical means for illustrating application of the present image data circuit to an auto-focussing camera.

Thus, the semiconductor apparatus 70 and the optical means 80 of FIG. 3 is integrated into a module of the image data circuit of FIG. 1. The image data circuit thus configured is operated by feeding the sensitivity signal SS and a detection command ST to the sequence control means 60. The test operation of the image data circuit conducted when the correction data have not been stored yet will now be described. The test operation is preferable conducted under uniform light irradiation onto the optical means 80.

The sequence control means 60 feeds the sensitivity signal SS in response to the detection command ST to the image sensors 10R, 10L and the first selecting means 51, and the reset pulse RP to the image sensors 10R, 10L and the counter circuits 30R, 30L after feeding an enable signal EN. Since the correction data has not been stored yet, the count values CR, CL of the counter circuits 30R, 30L are initialized to zero by the reset pulse RP. In principle, a clock command Sc is fed at the same time from the sequence control means 60 to the clock pulse generator circuit 40. By this, the optical sensing elements 11 of the image sensors 10R, 10L simultaneously start storing electric charges, and the counter circuits 30R, 30L increase the count values CR, CL in response to the clock pulse CP fed from the clock pulse generator circuit 40.

Since each of the optical sensing elements 11 of the image sensors 10R, 10L changes the logic state of its output signal TS as described earlier after elapse of the charge storage period corresponding to the received light quantity, the corresponding latch 21 of the quantizing circuits 20R, 20L reads in the count value CR or CL at that time and stores the read-in count value CR or CL as the image data DR or DL. Since the received light quantities, i.e. the charge storage periods represented by the low pulse width of the output signals TS from the optical sensing elements 11, are converted one by one to the image data DR and DL, the image data DR and DL are picked up from outside, e.g. to a testing microcomputer by feeding output commands one by one to the latches 21 of the quantizing circuits 20R, 20L for example from the sequence control means 60 after all the optical sensing elements 11 of the image sensors 10R, 10L completed their charge storage operations.

Figure 4:
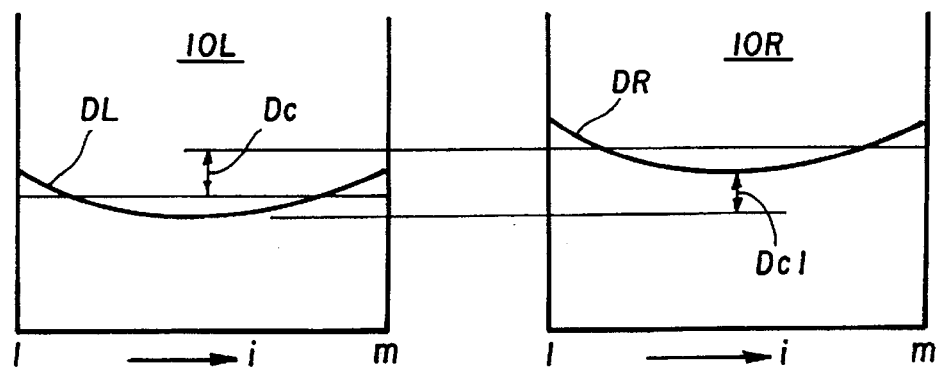
FIG. 4 is a graph showing image data distributions of the image sensors of FIG. 3.

Since the image data DR and DL show such distributions as shown in FIG. 4, it is preferable to set the correction data Dc at the difference of both distributions. When the image data DR and DL show such upward concave quadratic distributions as shown in the figure, the correction data Dc may be set at the difference Dcl between the minimum values of the image data DR and DL. The correction data Dc is preferably set for each sensitivity level indicated by the sensitivity signal SS. The set values are stored by the conventional methods in the memory area D1 and D2 of the permanent storage means 50. A command data of one bit is stored in the memory area D0 which corrects, in this embodiment, the image data DR or DL to the data of the lower level.

The practical operation is conducted similarly as the testing operation described above except the utilization of the correction data Dc. When the counter circuits 30R, 30L receive the reset pulse RP at the same time when the image sensors 10R, 10L starts, the counter circuits 30R, 30L, each of which is comprised of a programmable counter, read in the correction data Dc in a lower bit area 31. At the same time, since the correction data Dc selected by the selecting means 51 in response to the sensitivity signal SS is switched between the counter circuits 30R and 30L, the count value CR or CL of the counter circuit 30R or 30L designated by the data stored in the memory area D0 of the permanent storage means 50 is initialized with the correction data Dc. Therefore, since the corrected image data DR, DL corrected with the correction data Dc are stored in the quantizing circuits 20R, 20L when all the optical sensing elements 11 of the image sensors 10R, 10L completed their charge storage operations, the corrected image data DR, DL are transferred outside in the same way as described earlier or to the pertinent internal circuits. It is quite obvious that it takes no time, according to the present invention, to correct the image data DR, DL at the practical detection of a subject.

The present invention can be embodied into various modifications. For example, the counter circuits of the first embodiment, each of which is comprised of a programmable counter disposed on one of the image sensors may be replaced by a counter circuit commonly disposed on a pair of image sensors. The count value of the common counter circuit is corrected with the correction data in an operational circuit such as an adder circuit etc. and the corrected count value is fed to a quantizing circuit. In this modification, a count value, fed to a quantizing circuit corresponding to one of the image sensors, can be corrected with correction data set at each sensitivity level of the image sensor by disposing the selecting means 51 and 52 on the permanent storage means 50 in the same way as in the first embodiment.

Though the clock pulse generator circuit is started at the same time when the image sensors are started in the first embodiment, it is more advantageous in a practical automatic focussing operation in a camera for correctly detecting an image of a subject, the brightness of which varies over a wide range, to dispose on each image sensor or commonly on a pair of image sensors a detecting means, comprised of OR gates and/or NAND gates, for detecting the shortest charge storage period indicated by the output signal TS from the optical sensing element 11, and to trigger the clock pulse generator circuit 40 to generate the clock pulses at the timing corresponding to the shortest charge storage period. When the shortest charge storage period detecting means is disposed on each image sensor, the correction data Dc can be obtained easily from the difference between the shortest charge storage periods.

According to the present invention explained above, the difference of the image data levels, caused by the received light intensity difference between the image sensors and unique to each module, is corrected with the correction data, obtained by the test operation and stored in the permanent storage means. The correction is applied to each image sensor by correcting each count value of the counter circuit which counts the charge storage period indicated by the output signal from each optical sensing element with the clock pulses, and the quantizing circuit converts the corrected clock pulse count values corresponding to the charge storage period to the image data. Therefore, the image data circuit of the present invention shows the following effects.

(a) By accurately correcting the sensitivity difference between a pair of image sensors with the correction data, the precision of the image data of 5 to 6 bits corresponding to the error of 2 to 3% according to the prior art is improved to the precision of 8 bits or more corresponding to the error of less than 1%. When the image data circuit according to the present invention is applied to the image sensors for automatic focussing in the camera, the focussing of the camera is greatly improved.

(b) By correcting with the correction data the count values obtained by counting the charge storage period, the sensitivity difference between a pair of image sensors is corrected in a simple circuit simultaneously with converting the charge storage period of each optical sensing element to the image data at a high speed without spending any time for the correction. Therefore, the image data circuit according to the present invention facilitates increasing the automatic focussing speed of the video cameras.

(c) By disposing a pair of programmable counters, each of which corresponds to each of the image sensors, and initializing the count values of the programmable counters or the count value of the programmable counter with the correction data at the start of the image detection, the entire circuit configuration is simplified. By constituting the quantizing circuit with a plurality of latches, reading the count value from the counter circuit in the corresponding latch, and converting read-in count values to the image data in parallel, the time for image detection is shortened.

(d) By using the optical sensing elements, the detection sensitivities of which are changeable, and setting the correction data at every detection sensitivity level, the precision of the image data is improved by means of the improved accuracy of the correction data. By setting the correction data at the difference between the averages of the image data from the image sensors, the correction data are set easily and accurately.

(e) The image data circuit according to the present invention contributes to improving focussing accuracy and focussing speed of the auto-focussing cameras by effectively compensating the sensitivity difference between the image sensors and the distributions between the image data.

The invention has been described with reference to certain preferred embodiments thereof. It will be understood, however, that modifications and variations are possible within the scope of the appended claims.

What is claimed is:

1. An image data circuit for transferring image data from a pair of image sensors, each thereof having charge storage type optical sensing elements and receiving an image of a subject from an optical means, comprising:

a permanent storage means for storing correction data, obtained by a test operation conducted on the image sensors combined with the optical means, indicative of sensitivity difference between the image sensors;

a clock pulse generator circuit which generates clock pulses for counting charge storage periods indicated by output signals output from the optical sensing elements;

a counter circuit for counting the clock pulses and for outputting count values, corrected at every image detection with the correction data; and a quantizing circuit for receiving the output signals from the optical sensing elements and count values from the counter circuit and for converting the output signals to the image data corresponding to the received count values;

wherein the quantizing circuit further comprises a plurality of latches, each thereof corresponding to each of the optical sensing elements and storing as an image data a count value corresponding to a charge storage period indicated by an output signal from corresponding one of the optical sensing elements.

2. The image data circuit as claimed in claim 1, wherein the counter circuit further comprises a pair of programmable counters, each thereof corresponding to each of the image sensors, and the count values thereof being initialized with the correction data at the start of the image detection.

3. The image data circuit as claimed in claim 1, wherein the counter circuit further comprises a pair of programmable counters, each thereof corresponding to each of the image sensors, and the count value of one of the programmable counters being initialized with the correction data at the start of the image detection.

4. The image data circuit as claimed in claim 1, wherein the correction data are set based on the test operation conducted under uniform light irradiation on the optical means.

5. The image data circuit as claimed in claim 4, wherein the correction data are set based on a difference between averages of image data from the image sensors.

6. An image data circuit for transferring image data from a pair of image sensors, each thereof having charge storage type optical sensing elements and receiving an image of a subject from an optical means, comprising:

a permanent storage means for storing correction data, obtained by a test operation conducted on the image sensors combined with the optical means, indicative of sensitivity difference between the image sensors;

a clock pulse generator circuit which generates clock pulses for counting charge storage periods indicated by output signals output from the optical sensing elements;

a counter circuit for counting the clock pulses and for outputting count values, corrected at every image detection with the correction data; and a quantizing circuit for receiving the output signals from the optical sensing elements and count values from the counter circuit and for converting the output signals to the image data corresponding to the received count values;

wherein detection sensitivities of the optical sensing element are changeable, and the correction data are set at every detection sensitivity level.

7. The image data circuit as claimed in claim 6, wherein the counter circuit further comprises a pair of programmable counters, each thereof corresponding to each of the image sensors, and the count values thereof being initialized with the correction data at the start of the image detection.

8. The image data circuit as claimed in claim 6, wherein the counter circuit further comprises a pair of programmable counters, each thereof corresponding to each of the image sensors, and the count value of one of the programmable counters being initialized with the correction data at the start of the image detection.

9. The image data circuit as claimed in claim 6, wherein the correction data are set based on the test operation conducted under uniform light irradiation on the optical means.

10. The image data circuit as claimed in claim 9, wherein the correction data are set based on a difference between averages of image data from the image sensors.

* * * * *